(12) United States Patent
Lo et al.

(10) Patent No.: US 10,393,950 B2
(45) Date of Patent: Aug. 27, 2019

(54) BACKLIGHT MODULE AND DISPLAY DEVICE USING SAME

(71) Applicant: HON HAI PRECISION INDUSTRY CO., LTD., New Taipei (TW)

(72) Inventors: Wen-Chin Lo, New Taipei (TW); Chun-Yun Pan, New Taipei (TW); Sin-Tung Huang, New Taipei (TW); Chien-Yu Wei, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 23 days.

(21) Appl. No.: 15/259,250

(22) Filed: Sep. 8, 2016

(65) Prior Publication Data

US 2017/0343727 A1 Nov. 30, 2017

(30) Foreign Application Priority Data

May 25, 2016 (TW) .............................. 105116198 A

(51) Int. Cl.
*F21V 7/04* (2006.01)
*F21V 8/00* (2006.01)

(52) U.S. Cl.
CPC ........... *G02B 6/0085* (2013.01); *G02B 6/009* (2013.01); *G02B 6/0055* (2013.01); *G02B 6/0068* (2013.01)

(58) Field of Classification Search
CPC .. G02B 6/0085; G02B 6/0083; G02B 6/0086; G02F 2001/133317; G02F 1/133615
USPC ......................................................... 362/607
See application file for complete search history.

(56) References Cited

U.S. PATENT DOCUMENTS

2012/0236231 A1* 9/2012 Choi ...................... G02B 6/009
349/65
2012/0300137 A1* 11/2012 Kasai ................... G02B 6/0085
348/739

FOREIGN PATENT DOCUMENTS

| TW | 200843054 | * 11/2008 |
| TW | 200843054 A | 11/2008 |
| TW | 201019009 A | 5/2010 |

* cited by examiner

*Primary Examiner* — Matthew J. Peerce
(74) *Attorney, Agent, or Firm* — ScienBiziP, P.C.

(57) ABSTRACT

A backlight module having better heat dissipation, includes a backboard, a frame coupled to a peripheral area of the backboard, at least one light source, and a thermally conductive layer located on the backboard. The backboard is made of a thermally conductive material. The at least one light source is embedded in the thermally conductive layer and in direct contact with the thermally conductive layer which removes heat as it is generated by the light source.

10 Claims, 7 Drawing Sheets

BACKLIGHT MODULE AND DISPLAY DEVICE USING SAME

CROSS-REFERENCE TO RELATED APPLICATIONS

This application claims priority from Taiwan application Serial Number 105116198, filed on May 25, 2015, which is incorporated herein by reference.

FIELD

The subject matter herein generally relates to a light source in a backlight module and a display device using the light source.

BACKGROUND

A display device includes a backlight module for emitting light. The backlight module 1 (as shown in FIG. 1) includes a backboard 10, a plastic frame 11 located on peripheral area of the backboard 10, and an optical layer 12 located on the backboard 10 and surrounded by the plastic frame 11. The optical layer 12 includes a light guiding plate 121. The backlight module 1 further includes a light strip 13. The light strip 13 includes a substrate 131 and a plurality of lighting emitting diodes (LED) lamps 132 on the substrate 131. The light strip 13 is generally coupled to the plastic frame 11, and the LED lamps 132 face the backboard 10. As such, the LED lamps 132 are enclosed in an enclosed space (not shown) defined by the substrate 131, the plastic frame 11, the backboard 10, and the light guiding plate 121. Heat from the LED lamps 132 in the enclosed space is unable to dissipate to the outside of the backlight module 1 leading to device malfunction, damage, and ultimately device failure. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
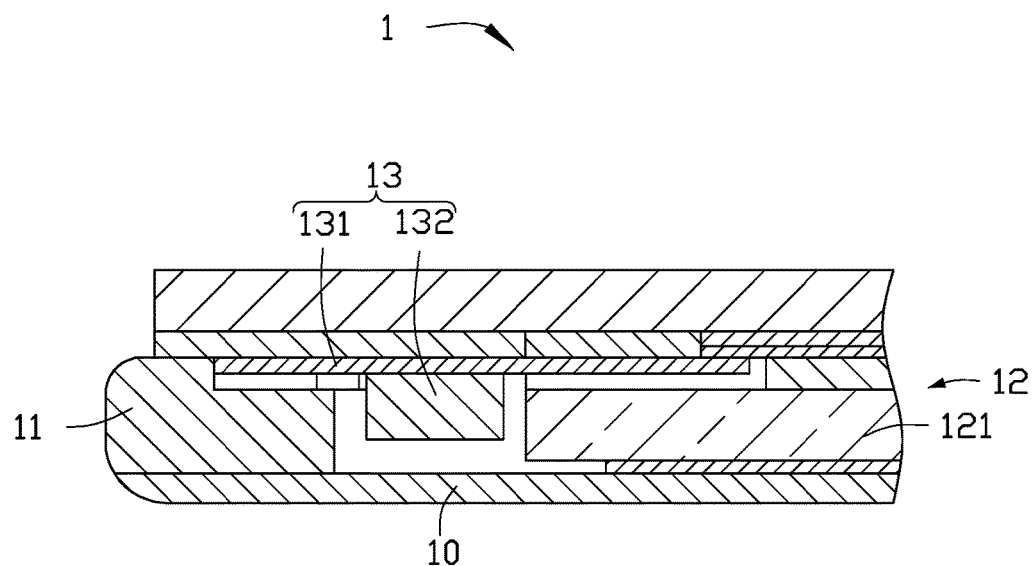
FIG. 1 is an isometric view of related art showing a backlight module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
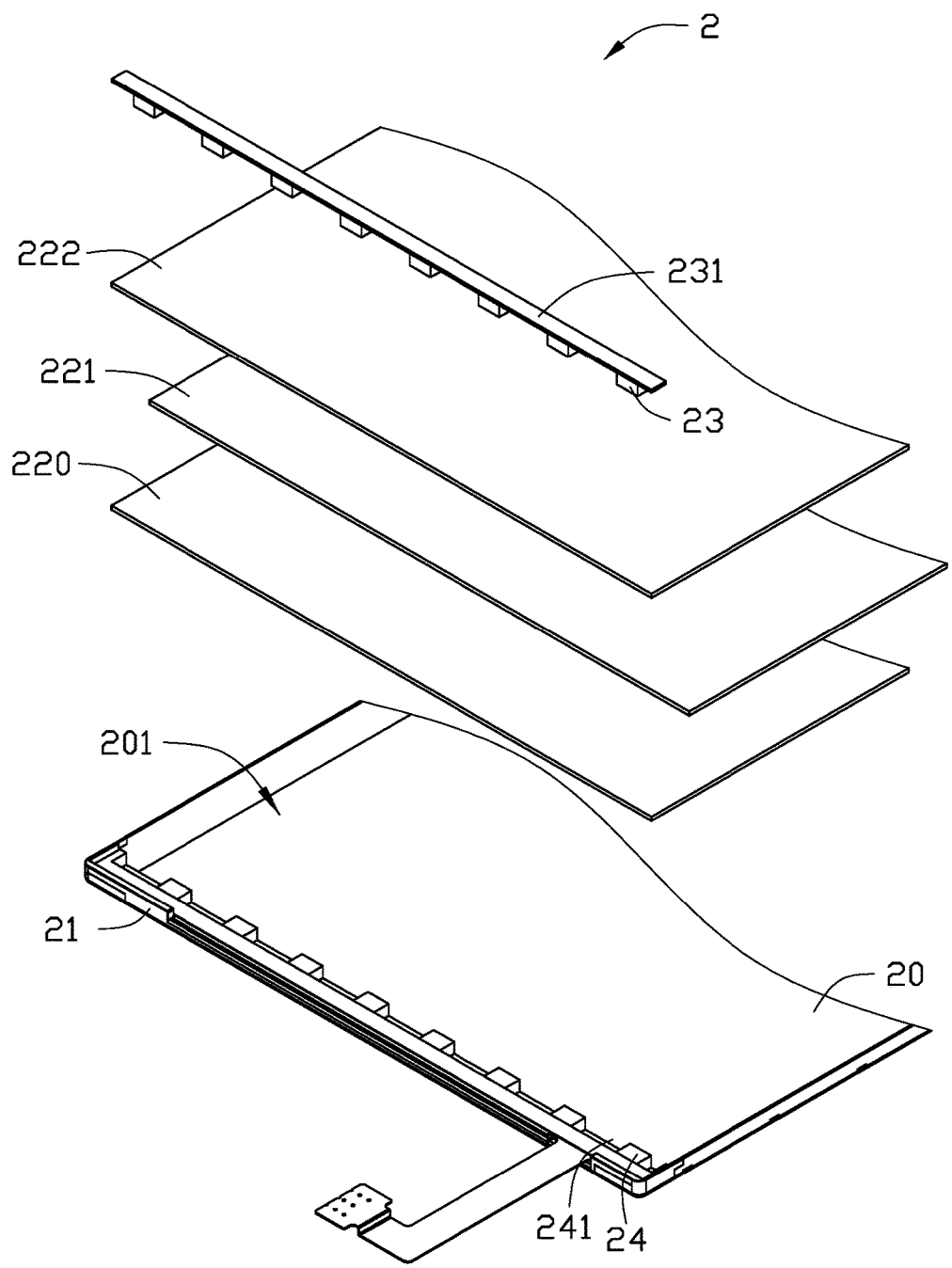
FIG. 2 is an exploded view of a first exemplary embodiment of a backlight module.
Figure 3:
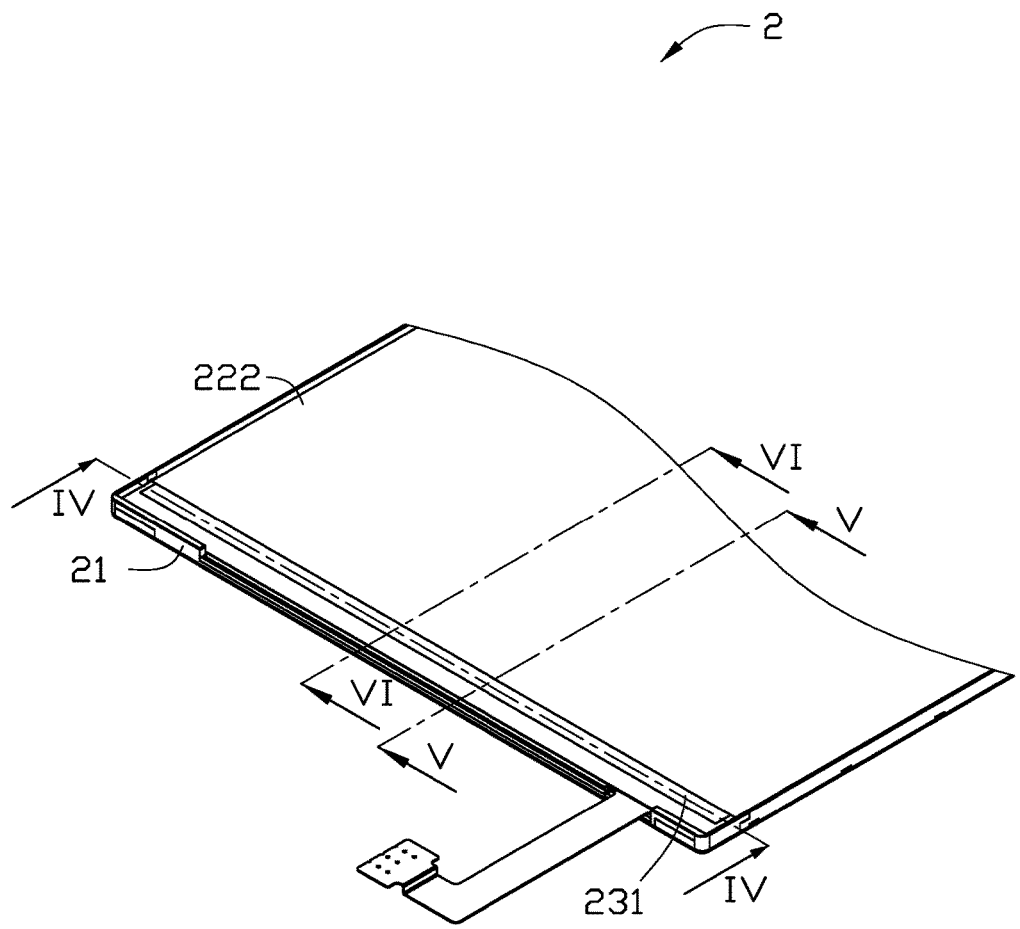
FIG. 3 is an isometric view of a first exemplary embodiment of a backlight module.

FIG. 2 and FIG. 3 illustrate a backlight module 2 according to a first exemplary embodiment. The backlight module 2 includes a backboard 20 and a frame 21 coupled to a peripheral area of the backboard 20. A receiving space 201 is defined by the backboard 20 and the frame 21.

The backboard 20 may be made of a thermally conductive material. In this embodiment, the backboard is made of a metal or metal alloy, such as stainless steel, aluminum alloy, or titanium alloy. The frame 21 is made of a plastic or similar bendable and/or transparent material.

The backlight module 2 further includes at least one light source 23 and a thermally conductive layer 24. The thermally conductive layer 24 is mounted on the backboard 20 and is received in the receiving space 201.

The at least one light source 23 is configured for emitting light. The at least one light source 23 can be LED lamps, cold cathode fluorescent lamps, hot cathode fluorescent lamps, or other lamps. In this embodiment, the light source 23 is LED lamps. The at least one light source 23 is mounted on a circuit board 231. The circuit board 231 is electrically coupled to a power source (not shown) to provide energy to the light source 23. The circuit board 231 can be flexible or rigid. In this embodiment, the circuit board 231 is a long strip. The light sources 23 are spaced apart from each other on the circuit board 231 and arranged in a line along an extending direction of the circuit board 231.

The backlight module 2 further includes a light guiding plate 221, a reflective film 220, and an optical film 222 received in the receiving space 201. The reflective film 220 is located on the backboard 20, the light guiding plate 221 is located on the reflective film 220, and the optical film 222 is located on the light guiding plate 221.

Figure 4:
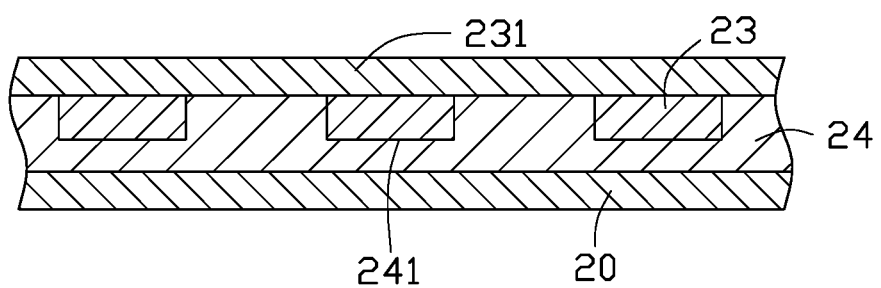
FIG. 4 is a cross-sectional view of FIG. 3 along line IV-IV.

As shown in FIG. 2 and FIG. 4, the thermally conductive layer 24 has a long strip shape and defines at least one groove 241 which does not pass through the thermally conductive layer 24. In this embodiment, there is a plurality of grooves 241, the grooves 241 are spaced apart from each other and are arranged in a line along an extending direction of the thermally conductive layer 24.

As shown FIG. 4, each light source 23 extends toward the thermally conductive layer 24 so as to make direct contact with the thermally conductive layer 24. A portion of each light source 23 extends deeper into one of the grooves 241 to have additional contact with the thermally conductive layer 24. In an example, the light sources 23 are embedded in the thermally conductive layer 24 and make direct contact with the thermally conductive layer 24. Heat produced by the light source 23 is thus transmitted to the thermally conductive layer 24, and then transmitted to the backboard 20 via the thermally conductive layer 24, and finally transmitted to the outside of the backlight module 2 via the backboard 20.

The thermally conductive layer 24 may be made of a transparent polymer having good thermal conductivity, such as silicon rubber.

As shown FIG. 3, the light sources 23 are embedded in the thermally conductive layer 24, while the circuit board 231 is located on the thermally conductive layer 24 and covers the thermally conductive layer 24.

Figure 5:
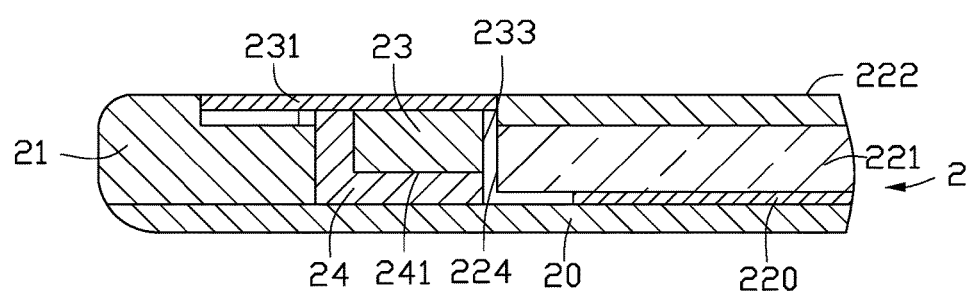
FIG. 5 is a cross-sectional view of FIG. 3 along line V-V.
Figure 6:
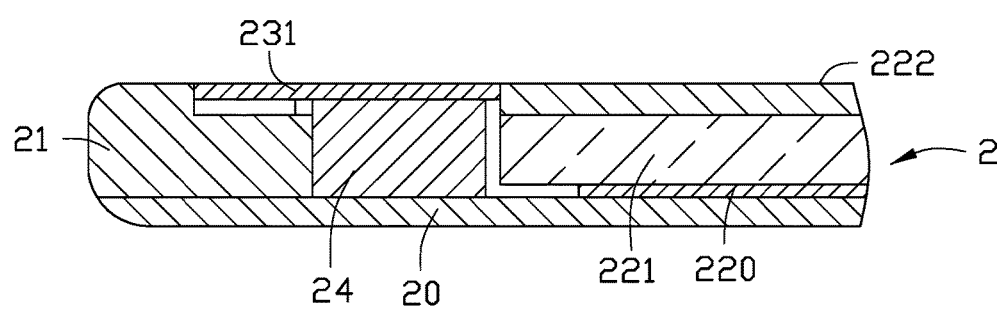
FIG. 6 is a cross-sectional view of FIG. 3 along line VI-VI.

FIG. 5 is a cross-sectional view of the backlight module along the line V-V of FIG. 3. As shown in FIG. 5, the line V-V crosses one of the grooves 241. FIG. 6 is a cross-sectional view of the backlight module along the line VI-VI of FIG. 3. As shown in FIG. 6, the line VI-VI does not cross the grooves 241. As shown in FIG. 5 and FIG. 6, the light guiding plate 221 is located at a side of the thermally conductive layer 24 facing away from the frame 21. The thermally conductive layer 24 and the light sources 23 are positioned between the frame 21 and the light guiding plate 221. Each light source 23 includes a light emitting surface 233 and the light guiding plate 221 includes a light incident surface 224. The grooves 241 pass through a side of the thermally conductive layer 24 facing the light guiding plate 221, thus the light emitting surfaces 233 of the light sources 23 in the grooves 241 directly face towards the light incident surface 224 of the light guiding plate 221.

In this embodiment, the light emitting surfaces 233 of the light sources 23 are spaced a distance from the light incident surface 224 of the light guiding plate 221. In other embodiment, the light emitting surfaces 233 of the light sources 23 can be in direct contact with the light incident surfaces 224 of the light guiding plate 221.

As shown in FIG. 4 and FIG. 5, each light source 23 has a same shape and size as those of the groove 241, thus each light source 23 embedded in one groove 241 can directly contact the thermally conductive layer 24. In other embodiment, the light sources 23 may have a size which is bigger than that of the groove 241, a portion of the light source 23 being received in the groove 241 and another portion of the light source 23 protruding outside of the groove 241. In some embodiments, the light emitting surfaces 233 protrude outside of the groove 241.

The light guiding plate 221 is configured to guide light into the light guiding plate 221. Light scattering features (not shown) may be located on either a top surface or on a bottom surface of the light guiding plate 221.

As shown in FIG. 5 and FIG. 6, the reflective film 220 is located at a side of the light guiding plate 221 adjacent to the backboard 20. The reflective film 220 is configured to reflect light back into the light guiding plate 221. The optical film 222 is located at a side of the light guiding plate 221 facing away from the backboard 20. The optical film 222 is configured to adjust the directions of light emissions and improve the light intensity. The optical film 222 may include a first diffusion layer (not shown), a brightness enhancement layer (not shown) on the first diffusion layer, and a second diffusion layer (not shown) on the brightness enhancement layer.

Figure 7:
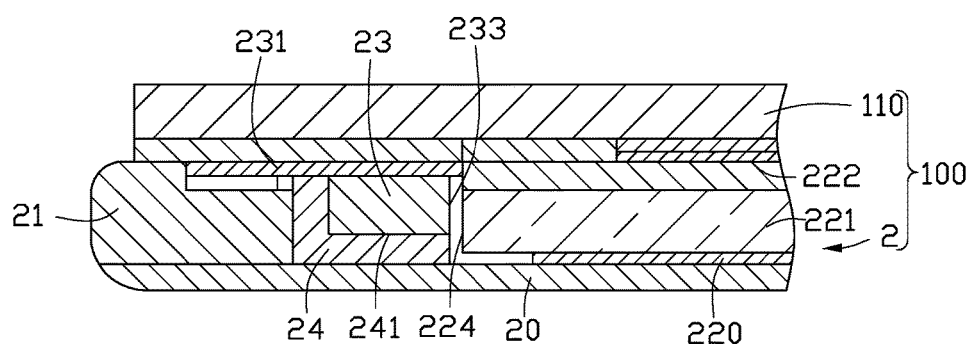
FIG. 7 is a cross-sectional view of a first exemplary embodiment of a display device implementing the exemplary backlight module of FIG. 3.

FIG. 7 illustrates a display device 100 using the backlight module 2. The display device 100 includes the backlight module 2 and a display panel 110 stacked on the backlight module 2. The display panel 110 is located on a surface of the backlight module 2 facing away from the backboard 20. The display device 100 may be a liquid crystal display device.

The display panel 110 can be a known type of display panel. For example, the display panel 110 can include, stacked in the following order, a first polarizer (not shown), a color filter substrate (not shown), a liquid crystal layer (not shown), a thin film transistor substrate (not shown), and a second polarizer (not shown).

The embodiments shown and described above are only examples. Many details are often found in the art such as the other features of backlight module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A backlight module comprising:
   a backboard made of a thermally conductive material, the backboard forming an outermost layer of the backlight module;
   a frame partially covering the backboard and in direct contact with the backboard;
   at least one lamp configured for emitting light; and
   a thermally conductive layer positioned on the backboard and in direct contact with the backboard and the frame;
   wherein the thermally conductive layer defines at least one groove, each of the at least one lamp is received in one of the at least one groove and in direct contact with the thermally conductive layer;
   the at least one lamp is mounted on a circuit board and in direct contact with the circuit board, the circuit board is located on a side of the thermally conductive layer away from the backboard and covers the at least one groove; the at least one lamp is inserted into the at least one groove from a side of the thermally conductive layer away from the backboard;
   wherein heat produced by the at least one lamp is transmitted to outside of the backlight module by the thermally conductive layer and the backboard; and
   further comprising a light guiding plate located on the backboard, the light guiding plate is located at a side of the thermally conductive layer away from the frame.

2. The backlight module of claim 1, wherein each groove passes through a side of the thermally conductive layer facing the light guiding plate.

3. The backlight module of claim 1, further comprising a reflective film and an optical film, the reflective film is located on the backboard, the light guiding plate is located on the reflective film, the optical film is located on the light guiding plate.

4. The backlight module of claim 1, wherein the backboard is made of metal or alloy.

5. The backlight module of claim 1, wherein thermally conductive layer is made of silicon rubber.

6. A display device comprising:
   a backlight module;
   the backlight module comprising:
   a backboard made of a thermally conductive material, the backboard forming an outermost layer of the backlight module;

a frame partially covers the backboard and is in direct contact with the backboard;

at least one lamp configured for emitting light; and a thermally conductive layer positioned on the backboard and in direct contact with the backboard and the frame;

wherein the thermally conductive layer defines at least one groove, each of the at least one lamp is received in one of the at least one groove and in direct contact with the thermally conductive layer; the least one lamp is mounted on a circuit board and in direct contact with the circuit board, the circuit board is located on a side of the thermally conductive layer away from the backboard and covers the at least one groove; the at least one lamp is inserted into the at least one groove from a side of the thermally conductive layer away from the backboard;

wherein heat produced by the at least one lamp is transmitted to outside of the backlight module by the thermally conductive layer and the backboard; and further comprising a light guiding plate located on the backboard, the light guiding plate at a side of the thermally conductive layer away from the frame.

7. The display device of claim 6, wherein each groove passes through a side of the thermally conductive layer facing the light guiding plate.

8. The display device of claim 6, further comprising a reflective film and an optical film, the reflective film is located on the backboard, the light guiding plate is located on the reflective film, the optical film is located on the light guiding plate.

9. The display device of claim 6, wherein the backboard is made of metal or alloy.

10. The display device of claim 6, wherein thermally conductive layer is made of silicon rubber.

* * * * *